United States Patent
Fukaya et al.

Patent Number: 5,150,303
Date of Patent: Sep. 22, 1992

[54] NUMERICAL CONTROL INFORMATION GENERATING APPARATUS AND METHOD FOR DETERMINING MACHINING MODE THEREOF

[75] Inventors: Yasushi Fukaya; Yuto Mizukami, both of Ooguchi, Japan

[73] Assignee: Kabushiki Kaisha Okuma Tekkosho, Aichi, Japan

[21] Appl. No.: 493,682

[22] Filed: Mar. 15, 1990

[30] Foreign Application Priority Data

Mar. 15, 1989 [JP] Japan .................................. 1-62957

[51] Int. Cl.$^5$ ..................... G06F 15/46; G05B 19/18
[52] U.S. Cl. ..................... 364/474.14; 364/474.21; 364/474.22
[58] Field of Search ................ 364/474.14, 474.21, 364/474.22–474.27, 191–193; 318/568.1

[56] References Cited

U.S. PATENT DOCUMENTS

| | | | |
|---|---|---|---|
| 4,521,860 | 6/1985 | Kanematsu et al. | 364/474.21 X |
| 4,530,046 | 7/1985 | Munekata et al. | 364/474.21 X |
| 4,547,854 | 10/1985 | Hashimoto et al. | 364/474.21 X |

*Primary Examiner*—Joseph Ruggiero
*Attorney, Agent, or Firm*—Wenderoth, Lind & Ponack

[57] ABSTRACT

In a numerical control information generating apparatus and a method for determining machining modes thereof, machining areas are divided appropriately and machining modes most suitable for each divided area are determined. Therefore, the most efficient tool trace can be obtaianed and the overall cutting time can be shortened.

9 Claims, 10 Drawing Sheets

PRIOR ART

NUMERICAL CONTROL INFORMATION GENERATING APPARATUS AND METHOD FOR DETERMINING MACHINING MODE THEREOF

BACKGROUND OF THE INVENTION

The present invention relates to a numerical control information generating apparatus for preparing information used to numerically control a numerical control machine tool according to data denoting the shapes of a starting material and a finished part, and a method for determining a machining mode thereof.

In a numerical control machine tool, numerical control information must be input prior to machining. Hence, an apparatus capable of easily preparing and generating numerical control information is used. With such a numerical control information generating apparatus, machining data consisting of the quality and shape of a material and machining modes (areas to be machined, cutting direction, cutting tool, sequence of machining, etc.) are input by an operator on an interactive basis to enable numerical control information to be obtained. In recent years, a numerical control information generating apparatus has been used which automatically determines the machining modes according to only the input data denoting the shapes of a starting material and a finished part and prepares numerical control information.

Figure 1:
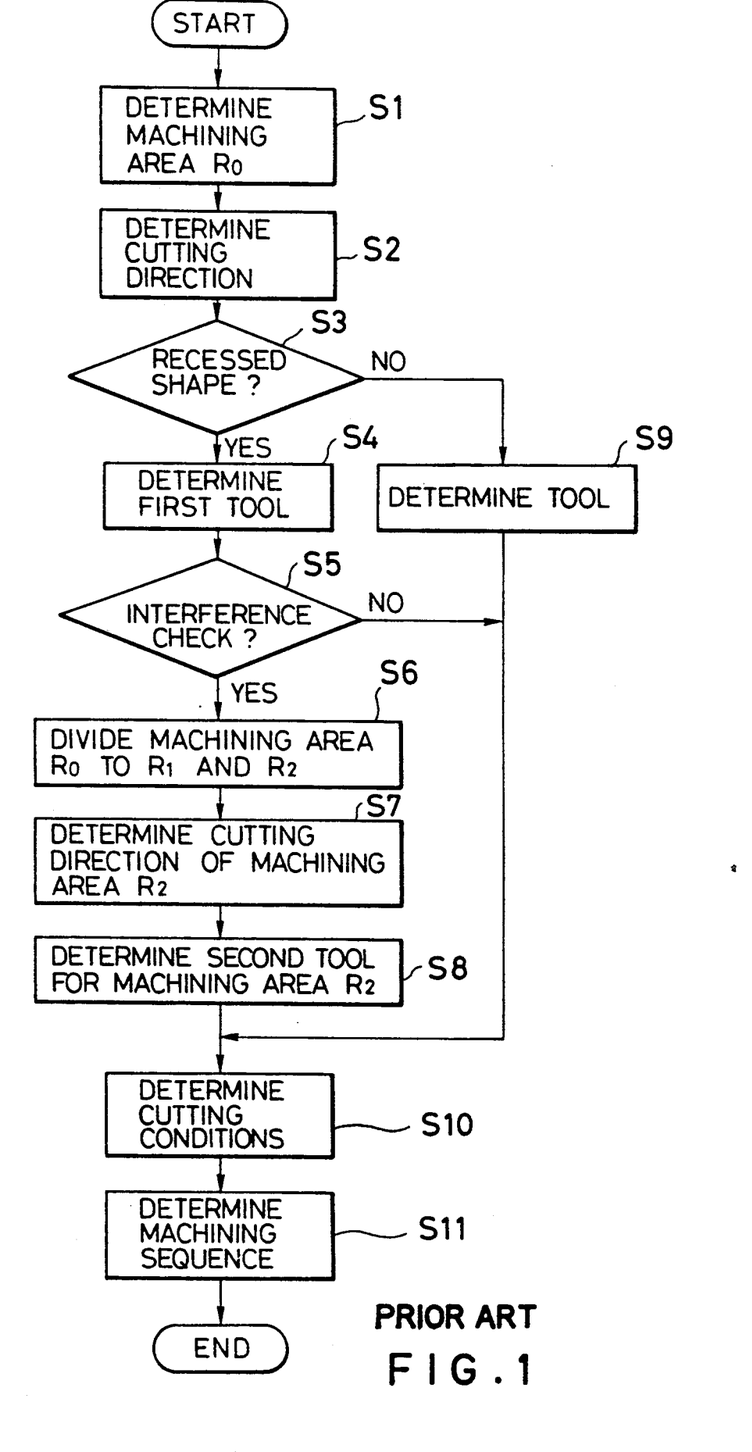
FIG. 1 is a flow chart for explaining an example of the operation of a conventional numerical control information generating apparatus.
Figure 2:
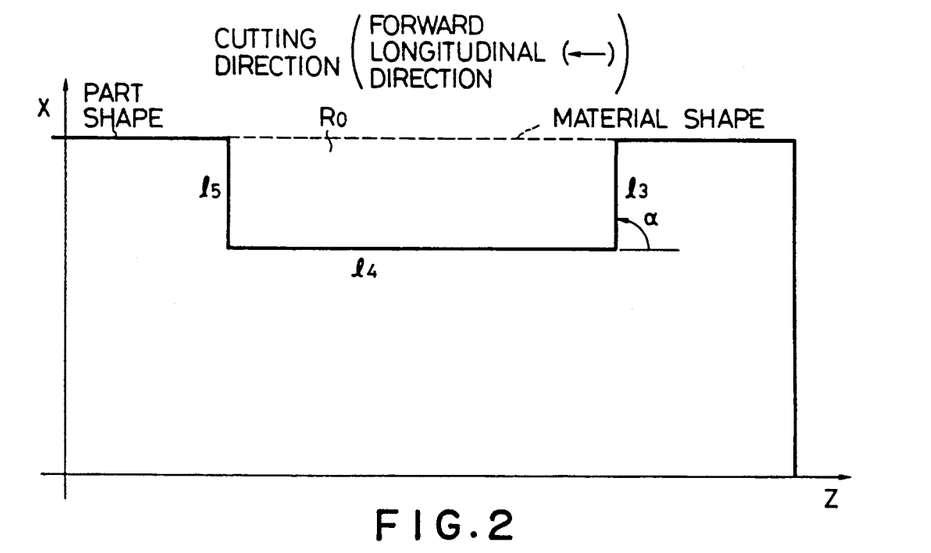
FIGS. 2 to 4, 5A, 5B, 6 and 7 are views illustrating concrete examples for explaining the method of determining machining modes in a conventional numerical control information generating apparatus.

A method for determining the machining modes, for example, for a recessed shape as shown in FIG. 2 using such a numerical control information generating apparatus will be explained with reference to the flow chart of FIG. 1. First, data denoting the shapes of the starting material and finished part are input and a machining area $R_0$ is determined by comparing the two shapes (Step S1). Since this machining area $R_o$ is located at an outer circumference, the cutting direction is initially determined to be in a forward longitudinal direction (←) (Step S2). It is then determined whether or not a downward cut is needed by comparing a figure element list $l_3$, $l_4$, $l_5$ constituting the shape of the machining area $R_0$ and the cutting direction (forward longitudinal (←)). When a downward cut is not needed, it is determined that the figure element list does not constitute a recessed shape (Step S3). A tool is selected according to the cutting direction (Step S9) and the operation proceeds to Step S10.

Figure 3:
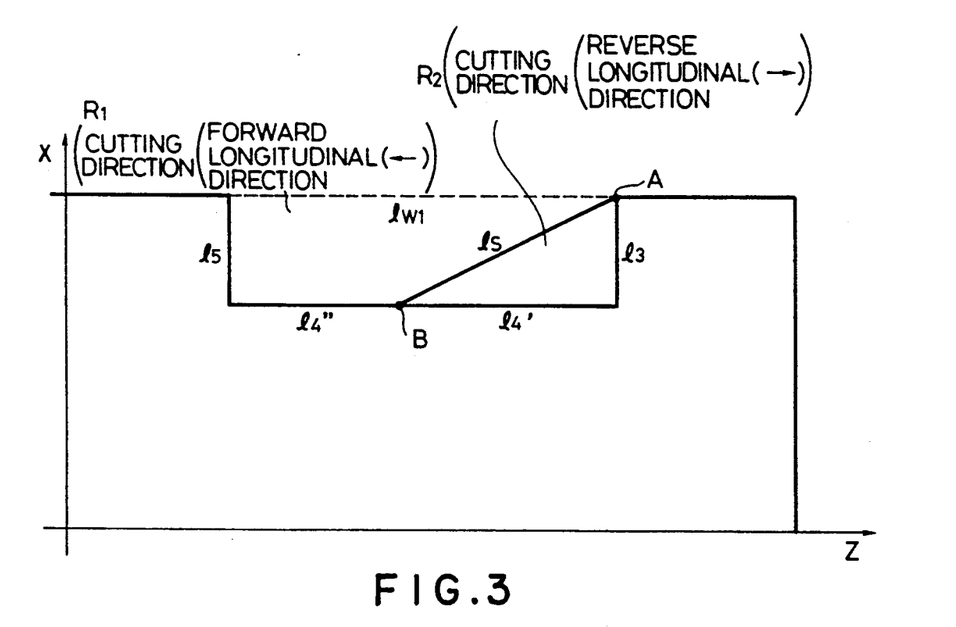
Figure 4:
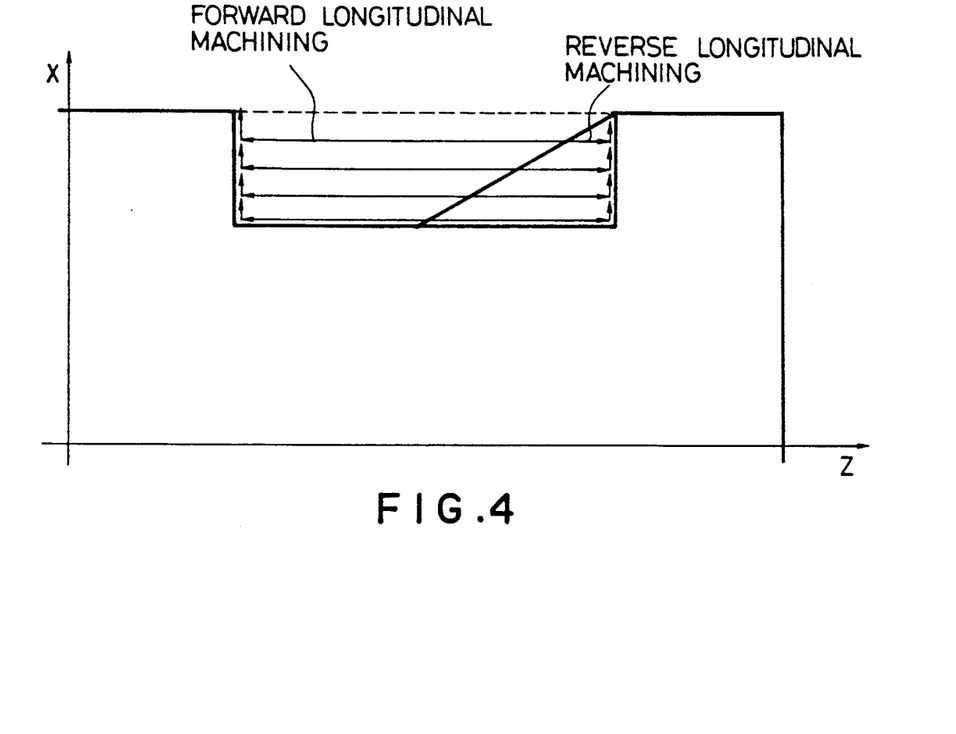
Figure 5A:
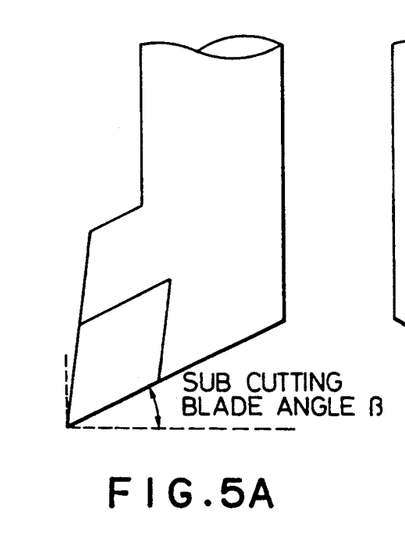
Figure 5B:
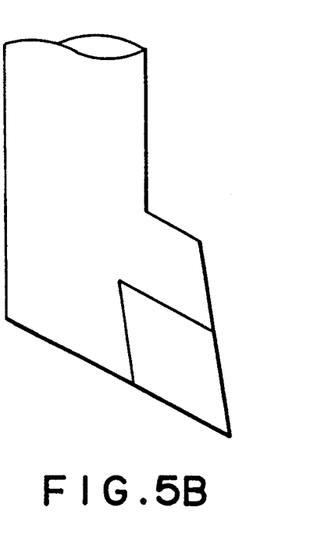

In the case of FIG. 2, however, a downward cut is needed since the figure element $l_3$ exists, and the figure element list $l_3$, $l_4$, $l_5$ is thus determined to be a recessed shape (Step S3). A forward longitudinal machining tool (FIG. 5A), which is the first tool, is selected by the result of this determination (recessed shape) and the cutting direction (forward longitudinal (←)) (Step S4). By comparing an angle $\alpha$ formed by the recessed downward shape (figure element $l_3$) relative to the Z-axis and an angle $\beta$ (hereinafter referred to as "sub cutting blade angle") formed by the sub cutting blade of a forward longitudinal machining tool relative to the Z-axis, it is determined whether or not the blade of the forward longitudinal machining tool will be interfered with during downward cutting (Step S5). In the case of $\alpha < \beta$, no interference occurs and a downward cut can be performed, and therefore the operation proceeds to the Step S10. In the case of FIG. 2, however, $\alpha \geq \beta$ and an interference occurs. Therefore, as shown in FIG. 3, a figure element $l_s$ which intersects the start point A of the downward element $l_3$, and which makes an angle with respect to the Z-axis, which is greater than the sub current blade angle $\beta$, is created. The figure element $l_4$ is divided into a figure element $l_4'$ and a figure element $l_4''$ at an intersecting point B of the figure element $l_4$ and the figure element $l_s$. The machining area $R_0$ is divided into machining areas $R_1$ and $R_2$ (Step S6). The cutting direction of the machining area $R_2$ is determined to be in a reverse longitudinal direction (→) (Step S7). A reverse longitudinal machining tool (FIG. 5B), which is the second tool, is selected according to this cutting direction (reverse longitudinal (→)) (Step S8). Cutting conditions and machining sequences are determined (Steps S10 and S11). Numerical control information is prepared on the basis of the machining modes determined as mentioned above, and all processes are terminated. Finally, a tool trace, as shown in FIG. 4, is obtained according to this numerical control information.

Figure 6:
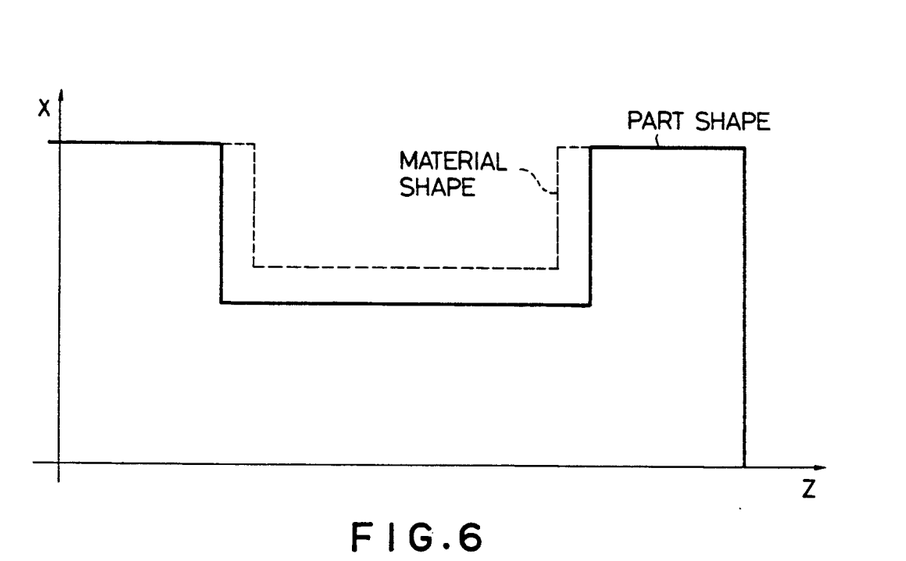
Figure 7:
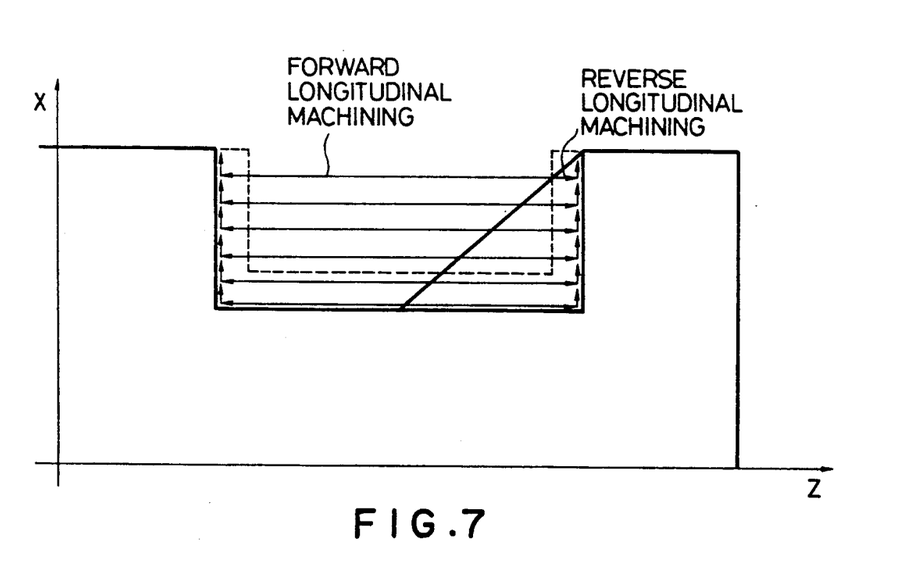

For example, in a case where the starting material and the finished part both contain recessed shapes, as shown in FIG. 6, the tool trace which is obtained from the numerical control information prepared by inputting these shape data into above-mentioned conventional numerical control information generating apparatus as shown in FIG. 7. In this tool trace, there has been a problem in that an idle cutting is performed in a portion within a recess of a material where cutting is not required and therefore the overall cutting time is increased.

SUMMARY OF THE INVENTION

The present invention has been devised in light of the above-mentioned circumstances. An object of the present invention is to provide a numerical control information generating apparatus capable of determining machining modes most suitable to the shape of a starting material and a method for determining the machining modes thereof.

According to one aspect of the present invention, for achieving the objects described above, there is provided a numerical control information generating apparatus which determines machining modes automatically in accordance with the input shapes of a starting material and finished part and which prepares numerical control information on the basis of thus determined machining modes, comprising means for determining a machining area by comparing said shapes of the starting material and finished part, for dividing the determined machining area into a forward end surface machining area which can be cut by a forward end surface machining tool, a reverse end surface machining area which can be cut by a reverse end surface machining tool, a forward longitudinal area which can be cut by a forward longitudinal machining tool, and a reverse longitudinal machining area which can be cut by a reverse longitudinal machining tool, and determining said machining modes for each divided machining area.

According to another aspect of this invention, there is provided a method of determining machining modes in a numerical control information generating apparatus for preparing information for numerically controlling a numerical control machining apparatus, comprising the steps of: accepting shape inputs of a material and parts; determining a machining area by comparing the input shapes of the starting material and finished part; dividing the determined machining area into a forward end surface machining area which can be cut by a forward end surface machining tool, a reverse end surface machining area which can be cut by a reverse end surface machining tool, a forward longitudinal machining area which can be cut by a forward longitudinal machining tool, and a reverse longitudinal machining area which can be cut by a reverse longitudinal machining tool; and determining said machining modes for each divided machining area.

These and other objects, features and advantages of the present invention will become clear from the following description of a preferred embodiment of the present invention with reference to the accompanying drawings.

DETAILED DESCRIPTION OF THE PREFERRED EMBODIMENT

Figure 8:
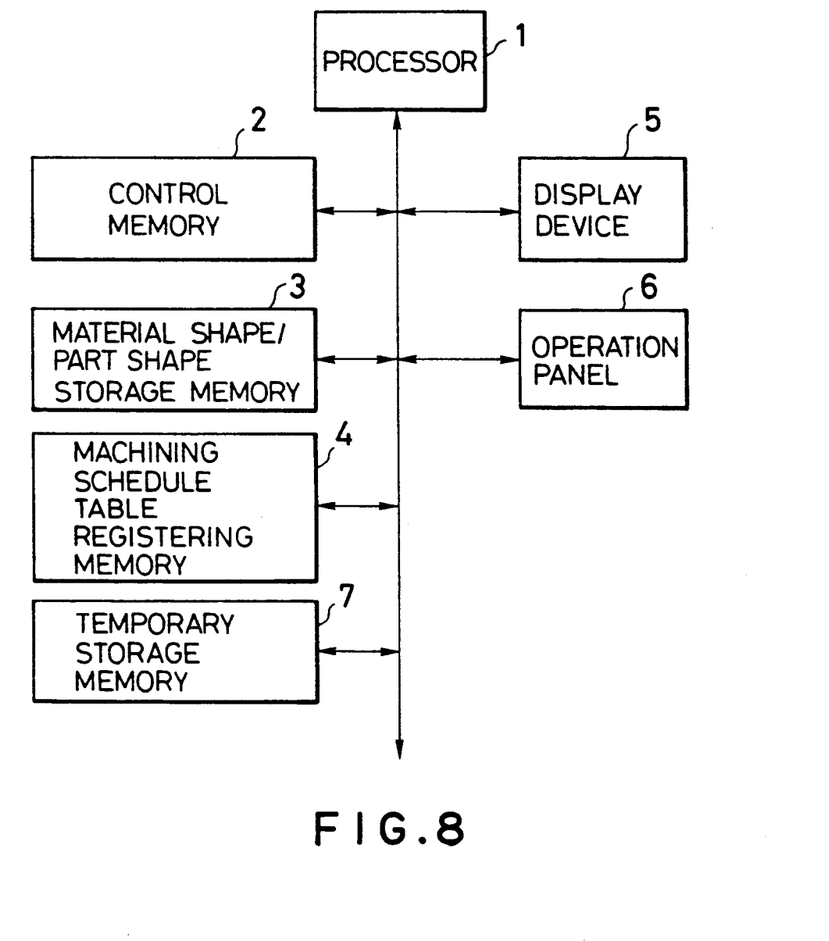
FIG. 8 is a block diagram illustrating one example of the numerical information generating apparatus of the present invention.
Figure 9A:
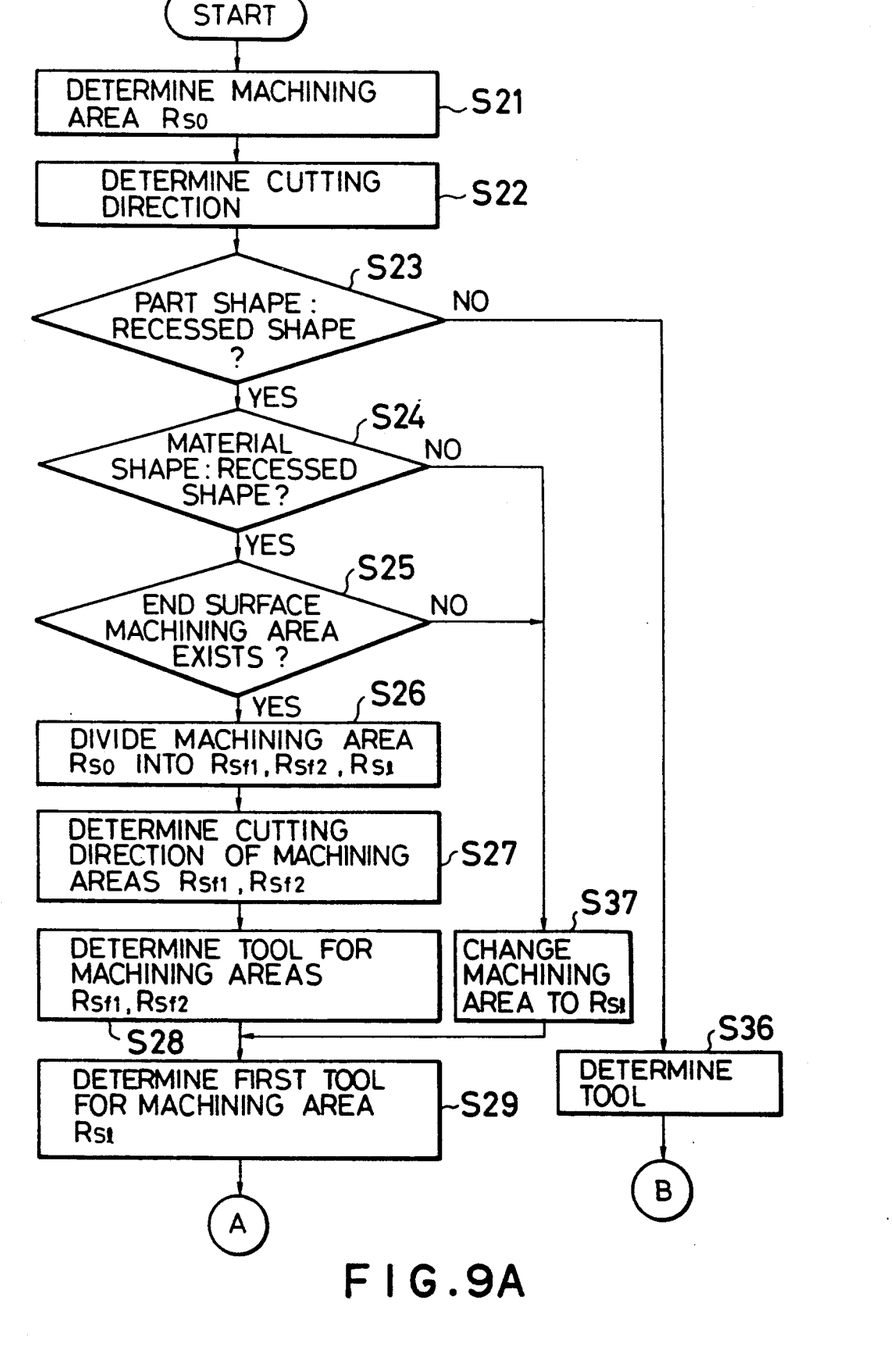
FIGS. 9A and 9B are flow charts for explaining examples of the operation of the apparatus of the present invention.
Figure 9B:
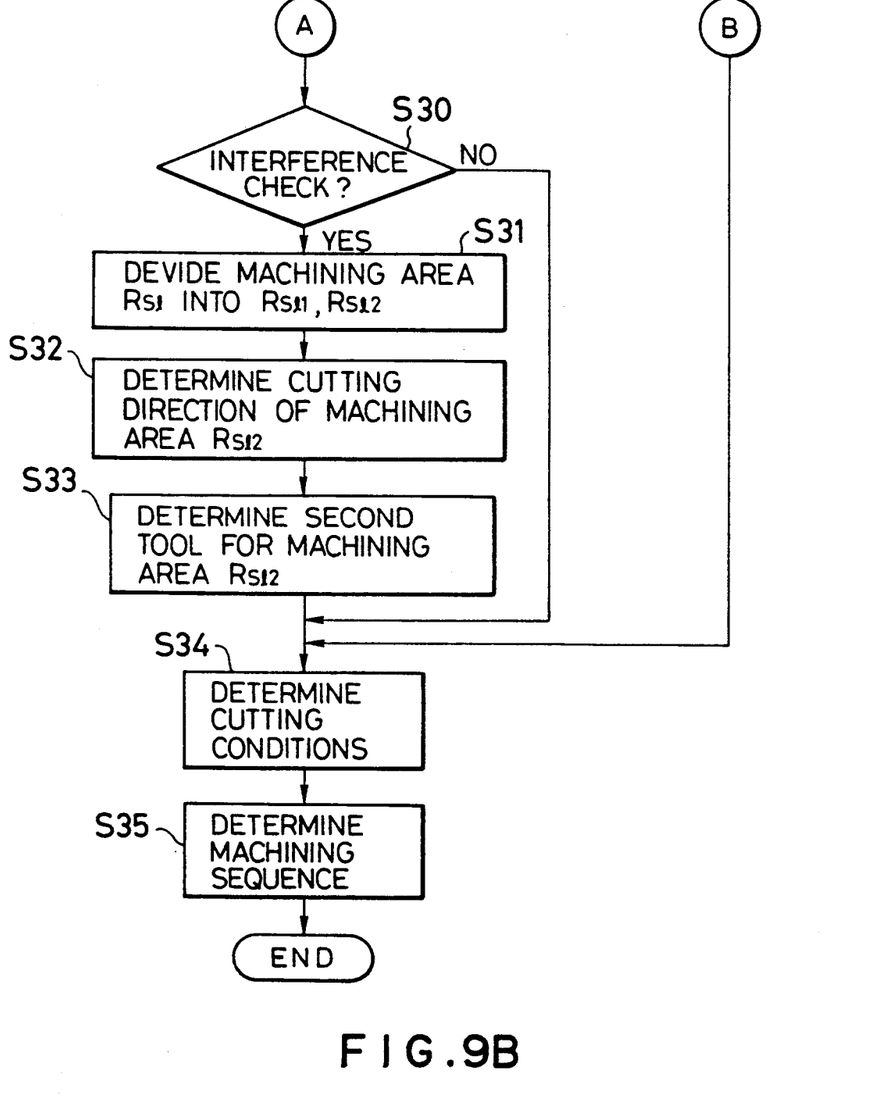

FIG. 8 is a block diagram illustrating one example of the numerical control information generating apparatus of the present invention. The configuration, and an example of the operation of the apparatus, will be explained with reference to the flow charts of FIGS. 9A and 9B.

Figure 10:
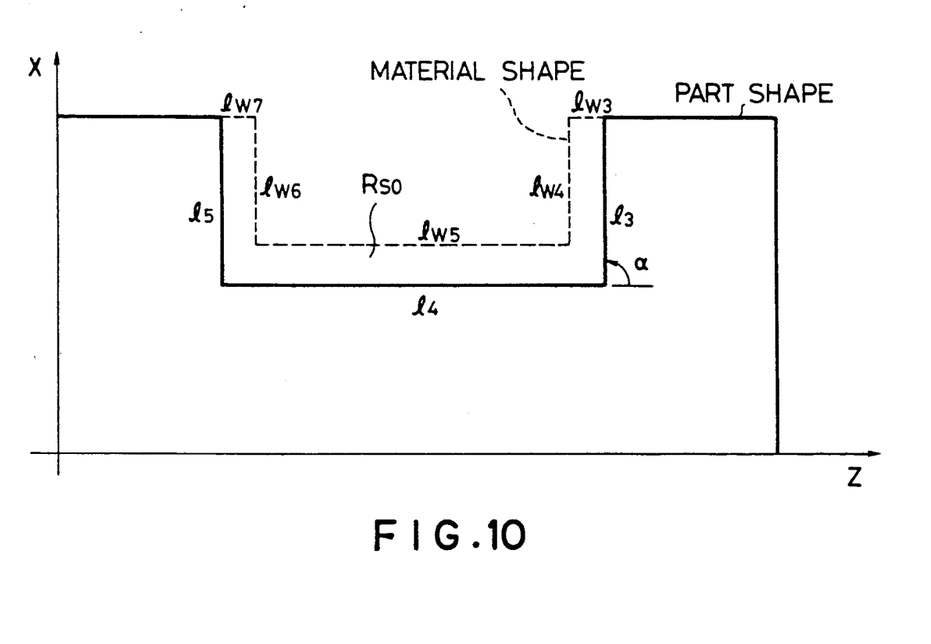
FIGS. 10 to 14 are views illustrating concrete examples for explaining the method of determining machining modes in the numerical control information generating apparatus of the present invention.

Data denoting the shapes of a starting material and a finished part, as shown in FIG. 10, are input via a display device 5 and an operation panel 6, and are stored in a material shape/finished part shape storage memory 3. A processor 1 reads out the shapes data from the material shape/finished part shape storage memory 3, compares them, determines a machining area $R_{so}$, and stores the same in a temporary storage memory 7 (Step S21). Since this machining area $R_{so}$ is located at an outer circumference, its cutting direction is initially determined to be a forward longitudinal direction (←), and this is also stored in the temporary storage memory 7 (Step S22). The figure elements $l_3$, $l_4$, $l_5$, defining the finished part shape, of this machining area $R_{so}$ and the cutting direction (forward longitudinal (←)) are read out from the temporary storage memory 7, and by comparing them it is determined whether or not a downward cut is needed. When a downward cut is not needed, it is determined that the figure element list does not define a recessed shape (Step S23) and a tool is selected according to the cutting direction (Step S36). The operation then proceeds to the Step S34. In the case of FIG. 10, however, since the figure element $l_3$ exists, a downward cut is needed. Therefore, the figure element list $l_3$, $l_4$, $l_5$ is determined to define a recessed shape (Step S23). Similarly, a figure element list $l_{w3}$, $l_{w4}$, $l_{w5}$, $l_{w6}$, $l_{w7}$, defining a starting material shape, of the machining area $R_{so}$ and the cutting direction (forward longitudinal (←)) are read out from the temporary storage memory 7. By comparing this data, it is determined whether or not a downward cut is needed. When a downward cut is not needed, it is determined that the figure element list does not define a recessed shape (Step S24) and the machining area is changed to $R_{s1}$ (Step S37). The operation then proceeds to the Step S29. In the case of FIG. 10, however, since the figure element $l_4$ exists, a downward cut is needed and, therefore, the figure element list $l_{w3}$, $l_{w4}$, $l_{w5}$, $l_{w6}$, $l_{w7}$, it is determined to define a recessed shape (Step S24). From the above, it follows that the machining area $R_{so}$ defines a recessed shape.

Figure 11:
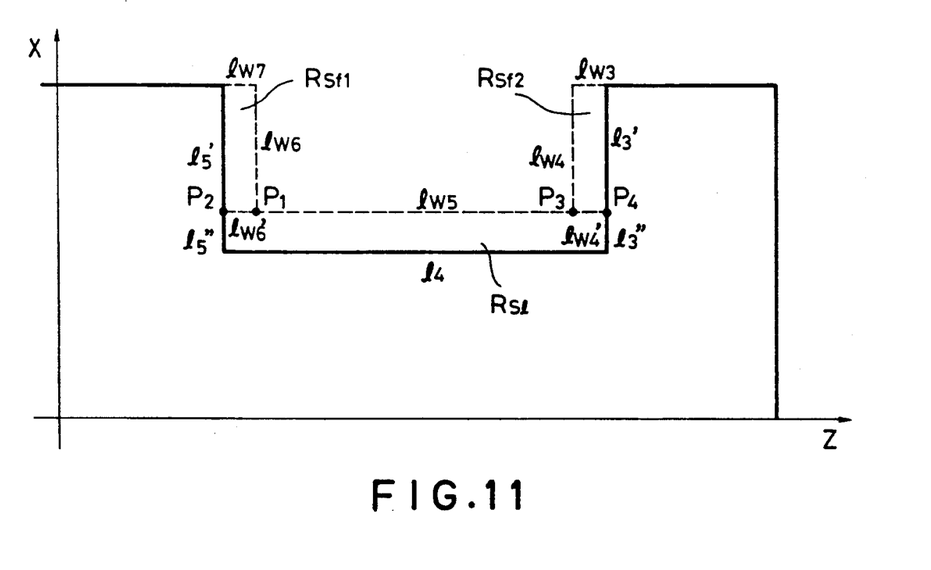

Next, it is checked whether or not an end surface machining area exists in this machining area $R_{so}$ (Step S25). When no end surface machining area exists, the operation proceeds to the Step S37. However, in the case of FIG. 10, when the lengths of figure elements $l_{w3}$ and $l_{w4}$, and $l_{w6}$ and $l_{w7}$ defining the starting material shape of the machining area $R_{s0}$ are compared respectively, the following relations hold: $l_{w3} < l_{w4}$ and $l_{w6} > l_{w7}$. Therefore, it is determined that a forward end surface machining area and a reverse end surface machining area exist (Step S25). Therefore, as shown in FIG. 11, the figure element $l_3$ is divided into figure elements $l_3'$ and $l_3''$ at a point $P_4$. In addition, by connecting the intersecting point $P_3$ of the figure elements $l_{w4}$ and $l_{w5}$ with the above-mentioned point $P_4$, a figure element $l_{w4}'$ is created. A reverse end surface machining area $R_{sf2}$, formed by a figure element list $l_{W3}$, $l_{W4}$, $l_{W4}'$, $l_{W3}'$, is created and stored in the temporary storage memory 7. Similarly, the figure element $l_5$ is divided into figure elements $l_5'$ and $l_5''$ at a point $P_2$. In addition, by connecting the intersecting point $P_1$ of figure elements $l_{w6}$ and $l_{w5}$ with the above-mentioned point $P_2$, a figure element $l_{w6}'$ is created. A forward end surface machining area $R_{sf1}$, formed by a figure element $l_{w7}$, $l_{w6}$, $l_{w6}'$, $l_5'$, is created and stored in the temporary storage memory 7. A longitudinal machining area $R_s$ formed by a figure element list $l_3''$, $l_{w4}'$, $l_{w5}$, $l_{w6}'$, $l_5''$, $l_4$ is stored in the temporary storage memory 7 (Step S26).

Figure 12:
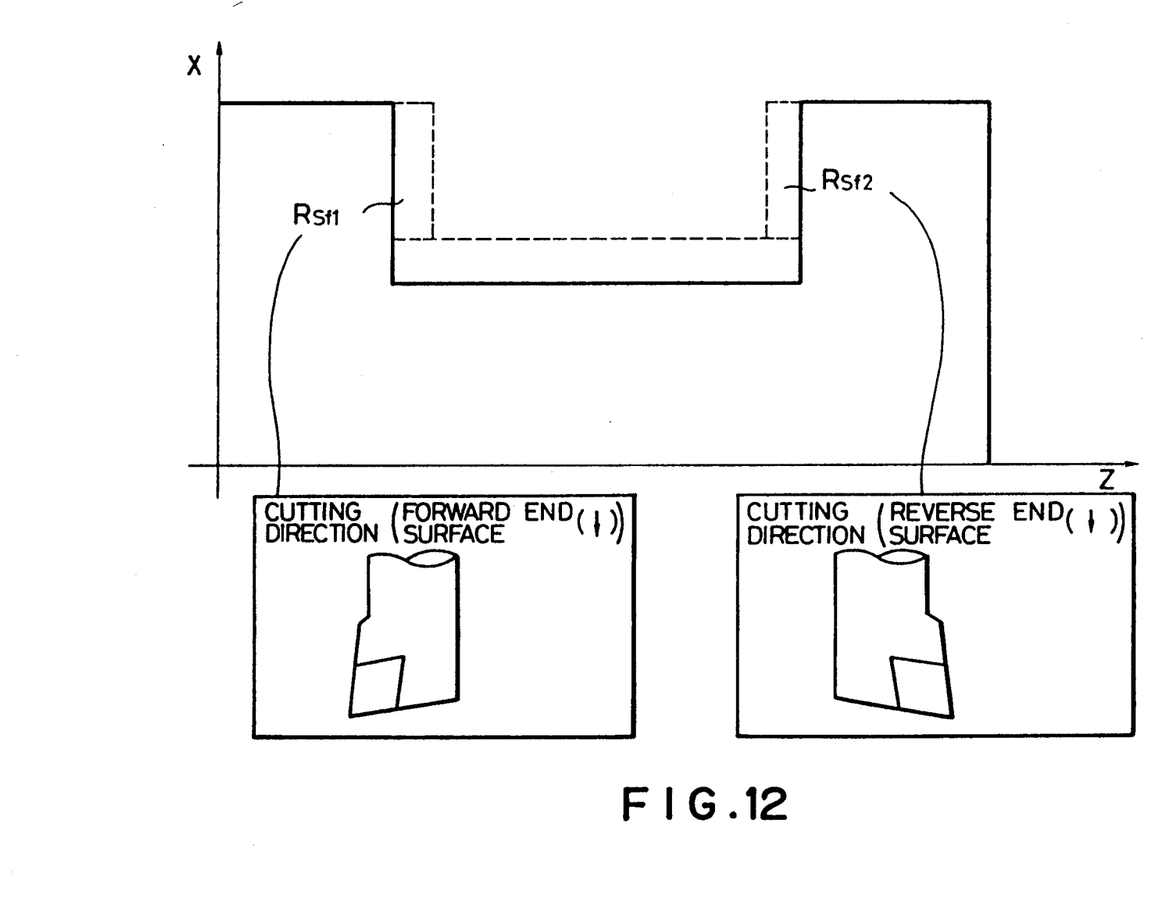
Figure 13:
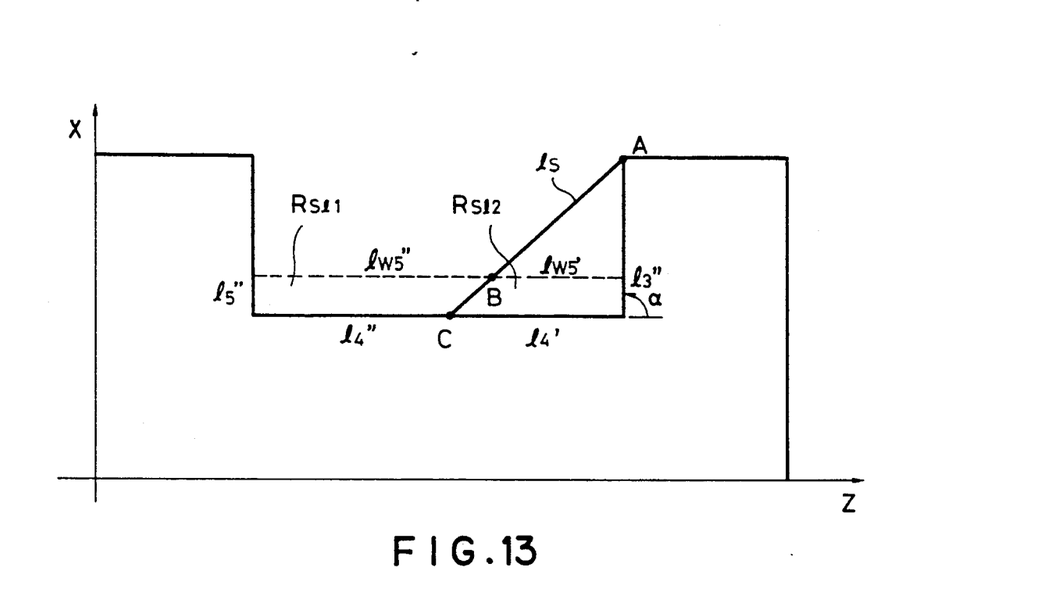

With respect to the forward end surface machining area $R_{sf1}$ and the reverse end surface machining area $R_{sf2}$, cutting directions as shown in FIG. 12 (forward end surface ( ↓ ) and reverse end surface ( ↓ )), a forward end surface machining tool and a reverse end surface machining tool are selected and stored in the temporary storage memory 7. A forward machining tool (FIG. 5A), which is the first tool, is determined by assuming that the cutting direction is the same as the cutting direction of the machining area $R_{s0}$ (forward longitudinal (→)) with respect to the longitudinal machining area $R_{s1}$ and stored in the temporary storage memory 7 (Steps S27, S28 and S29). It is checked whether or not the blade of a forward longitudinal machining tool will be interfered with during downward cutting by comparing the angle $\alpha$ formed by a recessed downward shape relative to the Z-axis and the sub cutting blade angle $\beta$ (Step S30). When $\alpha < \beta$, no interference occurs and a downward cut can be performed. The operation then proceeds to the Step S34. In this case, however, since $\alpha \geq \beta$ and an interference occurs, the figure element $l_s$ is created which passes an entry point A of the recessed shape and which makes an angle, with respect to the Z-axis, greater than the sub cutting blade angle $\beta$, as shown in FIG. 13. The figure element $l_{w5}$ is divided into figure elements $l_{w5}'$ and $l_{w5}''$ at an intersecting point B of figure lements $l_{w5}$ and $l_s$. In addition, the figure element $l_4$ is divided into figure elements $l_4'$ and $l_4''$ at an intersecting point C.

The machining area $R_{s1}$ is divided into a forward longitudinal machining area $R_{s11}$ and a reverse longitudinal machining area $R_{s12}$, each of which is stored in the temporary storage memory 7 (Step S31). The cutting direction of the reverse longitudinal machining area is determined to be in a reverse longitudinal direction (→) and stored in the temporary storage memory 7 (Step S32). According to this cutting direction (reverse longitudinal (→)), a reverse longitudinal machining tool, which is the second tool (FIG. 5B), is selected and stored in the temporary storage memory 7 (Step S33). As a result, in the temporary storage memory 7 are stored machining areas $R_{sf1}$, $R_{sf11}$, $R_{sf12}$ and their cutting directions and cutting tools. The processor 1 determines cutting conditions and machining sequences for each of the areas (Steps S34 and S35).

Figure 14:
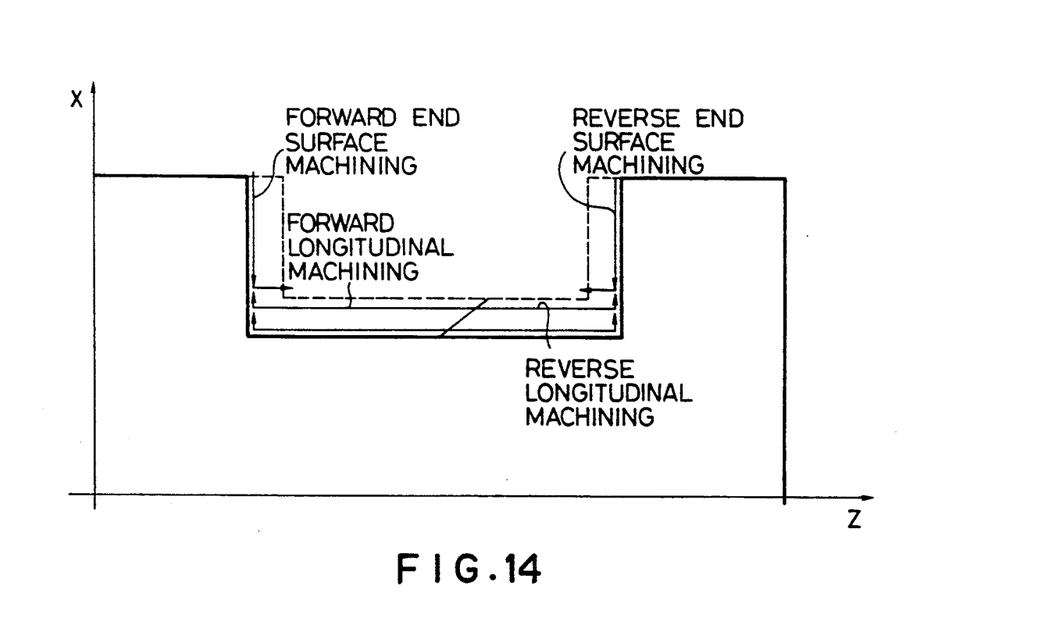

The machining modes determined as mentioned above are entered in a machining schedule registering memory 4, and numerical control information is prepared on the basis of these machining modes, thus completing all processes. Finally, a tool trace shown in FIG. 14 for machining only a recessed shape can be obtained according to this numerical control information.

As set forth hereinabove, according to the numerical control information generating apparatus and the method for determining machining modes thereof of the present invention, machining modes most suitable to the shape of a material can be determined automatically and therefore an operating ratio can be improved greatly and machining cost can be reduced.

As many apparently widely different embodiments of the present invention can be made without departing from the spirit and scope thereof, it is to be understood that this invention is not limited to the specific embodiments thereof except as defined in the appended claims.

What is claimed is:

1. A numerical control information generating apparatus for automatically determining machining modes of a numerical control machining device based on data denoting a shape of a starting material and a shape of a finished part, comprising:
   means for determining a machining area by comparing the shape of the starting material and the shape of the finished part;
   means for dividing the machining area into a forward end surface machining area which can be cut by a forward end surface machining tool, a reverse end surface machining area which can be cut by a reverse end surface machining tool, a forward longitudinal machining area which can be cut by a forward longitudinal machining tool, and a reverse longitudinal machining area which can be cut by a reverse longitudinal machining tool; and
   means for determining the machining modes for each of the forward end surface, reverse end surface, forward longitudinal and reverse longitudinal machining areas.

2. A numerical control information generating apparatus according to claim 1, further comprising an operation panel and a display device for receiving input information denoting the shapes of the starting material and finished part.

3. A numerical control information generating apparatus according to claim 2, further comprising a first memory for storing the data denoting the shapes of the starting material and finished part, and a second memory for temporarily storing each machining area and the cutting direction and cutting tool thereof.

4. A numerical control information generating apparatus according to claim 3, further comprising a third memory for storing the determined machining modes.

5. A method for determining machining modes of a numerical control machining device based on data denoting a shape of a starting material and a shape of a finished part, comprising the steps of:
   determining a machining area by comparing the shapes of the starting material and the finished part;
   dividing the thus determined machining area into a forward end surface machining area which can be cut by a forward end surface machining tool, a reverse end surface machining area which can be cut by a reverse end surface machining tool, a forward longitudinal machining area which can be cut by a forward longitudinal machining tool, and a reverse longitudinal machining area which can be cut by a reverse longitudinal machining tool; and
   determining the machining modes for each of the machining areas obtained in said dividing step.

6. A method according to claim 5, further comprising determining a cutting direction after said step of determining the machining area.

7. A method according to claim 6, wherein said dividing step includes determining whether the shape of the finished part defines a recessed shape, determining whether the shape of the starting material defines a recessed shape, and determining whether an end surface machining area exists.

8. A method according to claim 7, further comprising, after said dividing step, determining a cutting direction and a cutting tool for each of the machining areas obtained in said dividing step.

9. A method according to claim 8, further comprising, after the cutting direction and cutting tool for said each of the machining areas obtained in said dividing step are determined, determining whether a blade of each cutting tool will be interfered with during cutting.

* * * * *